(12) United States Patent
Spears, II (10) Patent No.: US 9,151,426 B2
(45) Date of Patent: Oct. 6, 2015

(54) CLOSURE FITTING FOR CONTAINMENT PIPING

(71) Applicant: Spears Manufacturing Co., Sylmar, CA (US)

(72) Inventor: Robert W. Spears, II, Sylmar, CA (US)

(73) Assignee: Spears Manufacturing Co., Sylmar, CA (US)

( * ) Notice: Subject to any disclaimer, the term of this patent is extended or adjusted under 35 U.S.C. 154(b) by 185 days.

(21) Appl. No.: 14/012,301

(22) Filed: Aug. 28, 2013

(65) Prior Publication Data

US 2015/0059862 A1 Mar. 5, 2015

(51) Int. Cl.
*F16L 39/00* (2006.01)
*F16L 49/06* (2006.01)
*F16L 55/168* (2006.01)

(52) U.S. Cl.
CPC .............. *F16L 39/005* (2013.01); *F16L 49/06* (2013.01); *F16L 55/168* (2013.01); *F16L 2201/20* (2013.01); *Y10T 137/0447* (2015.04); *Y10T 137/5762* (2015.04)

(58) Field of Classification Search
CPC ....... F16L 39/005; F16L 55/168; F16L 49/06; F16L 2201/20; F16L 23/02; F16L 3/18; Y10T 137/5762; Y10T 137/0447; B64D 37/005; B64D 37/32
USPC .......................................................... 137/312
See application file for complete search history.

(56) References Cited

U.S. PATENT DOCUMENTS

| 4,127,286 | A | * | 11/1978 | Albertsen ........................ 285/41 |
| 4,687,232 | A | * | 8/1987 | Zimmerman .................... 285/31 |
| 4,732,414 | A | * | 3/1988 | Inaba ........................ 285/123.15 |
| 5,433,484 | A | * | 7/1995 | Ewen et al. .................. 285/21.2 |
| 6,682,102 | B1 | * | 1/2004 | Betz ........................... 285/123.15 |
| 2001/0019208 | A1 | * | 9/2001 | Takamatsu ................. 285/125.1 |
| 2002/0093195 | A1 | * | 7/2002 | Poehler ....................... 285/123.1 |
| 2003/0160449 | A1 | * | 8/2003 | Min-Cheol ................... 285/322 |
| 2009/0091126 | A1 | * | 4/2009 | Carns et al. ............... 285/123.15 |
| 2009/0284004 | A1 | * | 11/2009 | Simmons et al. ......... 285/123.15 |
| 2010/0001515 | A1 | * | 1/2010 | Suzuki .......................... 285/113 |
| 2014/0117162 | A1 | * | 5/2014 | Courpet et al. ............... 244/132 |

\* cited by examiner

*Primary Examiner* — John K Fristoe, Jr.
*Assistant Examiner* — Kevin Barss
(74) *Attorney, Agent, or Firm* — Denton L. Anderson; Leech Tishman Fuscaldo & Lampl (57) ABSTRACT

A closure fitting for enclosing a portion of one or more carrier conduits between a first containment conduit section and an opposed second containment conduit section has: (a) a first cylindrical hollow body; (b) a second cylindrical hollow body, the second body being reversibly attached in fluid tight communication to the first body; (c) a first seal for sealing the first body to the first containment conduit section and a second seal for sealing the second body to the second containment conduit section, wherein and (d) a third seal for reversibly sealing the first body to the second body. In the invention, at least one of the first or second seals allows one of the bodies to axially move with respect to its containment conduit section.

18 Claims, 4 Drawing Sheets

CLOSURE FITTING FOR CONTAINMENT PIPING

FIELD OF THE INVENTION

This invention relates generally to pipe fittings, and, more specifically, to closure fittings for enclosing a portion of one or more carrier conduits between a first containment conduit section and a second containment conduit section.

BACKGROUND OF THE INVENTION

A containment conduit is often used to house one or more carrier conduits, where the carrier conduits transport hazardous materials. The purpose of the containment conduit is to contain leaks that may develop in the carrier conduits.

When one of the carrier conduits is in need of repair or when it is desired to modify one of the carrier conduits, the containment conduit surrounding that carrier conduit must be cut into to allow access to the carrier conduit. This results in an open section in the containment conduit, typically defining a first containment conduit section and an opposed second containment conduit section. After repairs or modifications are accomplished to the carrier conduit, the two containment conduit sections must be sealed to one another—to thus reestablish the overall seal of the containment conduit. Typically, a closure fitting is employed to seal the two containment sections to one another.

Also, closure fittings are frequently employed during the initial installation of a carrier conduit within a containment conduit when the containment conduit is either pre-existing or is otherwise fixed in place.

Prior art closure fittings typically comprise one or more couplings that slide over the exposed open ends of the two containment sections and seal the two containment sections to one another. It is also typical that the one or more couplings must be simultaneously cemented or welded (depending on the containment pipe material) to the exposed open ends of the containment conduit sections. The drawback to such prior art closure fitting is that it is difficult to accomplish quality simultaneous cementing or welding jobs. Also, the fully assembled closure fitting is permanently attached to the conduit sections, so that, if a problem were to develop with the repair or modification to the containment pipe, the closure fitting must be cut away and replaced.

Accordingly, there is a need for a closure fitting that provides easier assembly and can be easily separated after installation to provide access to the one or more carrier pipes.

SUMMARY OF THE INVENTION

The invention satisfies this need. One aspect the invention is a closure fitting for enclosing a portion of one or more carrier conduits between a first containment conduit section and an opposed second containment conduit section. The closure fitting comprises:

(a) a first cylindrical hollow body having a proximal end and a distal end;

(b) a second cylindrical hollow body having a proximal end and a distal end, the proximal end of the second body being reversibly attached in fluid tight communication to the proximal end of the first body;

(c) a first seal for sealing the first body to the proximal end portion of the first containment conduit section and a second seal for sealing the second body to the proximal end portion of the second containment conduit section, wherein (i) the first seal allows the first body to axially move with respect to the first containment conduit section, or (ii) the second seal allows the second body to axially move with respect to the second containment conduit section, or (iii) the first seal allows the first body to axially move with respect to the first containment conduit section and the second seal allows the second body to axially move with respect to the second containment conduit section; and (d) a third seal for reversibly sealing the proximal end of the first body to the proximal end of the second body.

The closure fitting forms a cylinder which is capable of sealing in fluid tight fashion the proximal end portion of the first containment conduit to the proximal end portion of the second containment conduit. However, the first body and/or the second body are capable of being reversibly and axially separated from one another to allow access to one or more carrier conduits disposed between the first containment conduit and the second containment conduit.

A second aspect of the invention is a kit comprising the above described parts of the closure fitting of the invention, each part being capable of being assembled in the above described manner.

A third aspect is a method of assembling the kit of the invention to seal a pair of containment sections with the closure fitting of the invention.

The closure fitting provides a way to quickly seal the containment conduits, while at the same time it allows for easy removal to treat leaks that may develop in the carrier conduits.

DRAWINGS

These and other features, aspects and advantages of the present invention will become better understood with reference to the following description, appended claims and accompanying drawings where:

DETAILED DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well.

One aspect of the invention is a closure fitting 10 usable for enclosing a portion of one or more carrier conduits 12 between a first containment conduit section 14 and an opposed second containment conduit section 16, wherein (1) the first containment conduit section 14 has a first containment section proximal end portion 18 terminating in an open end and the second conduit section has a second containment section proximal end portion 20 terminating in an open end; and (2) the first containment section proximal end portion 18 is opposed to and spaced apart from the open end of the second containment section proximal end portion 20.

The closure fitting 10 comprises a first cylindrical hollow body 22, a second cylindrical hollow body 24, a first seal 26, a second seal 28, and a third seal 30.

The first and second cylindrical hollow bodies 22 and 24 each have a proximal end portion 32 and a distal end portion 34. The first seal 26 seals the first cylindrical body 22 to the proximal end portion 18 of the first containment conduit 14. The second seal 28 seals the second body 24 to the proximal end portion 20 of the second containment conduit 16. In one embodiment, the hollow bodies 22 and 24 are sufficiently transparent to allow visual access to their interiors.

In the invention, either (1) the first seal 26 allows the first body 22 to axially move with respect to the first containment conduit section 14, (2) the second seal 28 allows the second body 24 to axially move with respect to the second containment conduit section 16, or, as illustrated in the drawings, (3) the first seal 26 allows the first body 22 to axially move with respect to the first containment conduit section 14 and the second seal 28 allows the second body 24 to axially move with respect to the second containment conduit section 16.

The third seal 30 reversibly seals the proximal end portion 32 of the first body 22 to the proximal end portion 32 of the second body 24. In the embodiments of the invention illustrated in the drawings, the proximal end portion 32 of one of the cylindrical bodies 22 or 24 comprises a threaded proximal end 36, and the third seal 30 comprises a gasket 39 such as an O-ring 41, and a threaded nut 38 for attachment to the threaded proximal end 36 of the cylindrical body 22 or 24. Other methods of providing the third seal 30 include, but are not limited to bolted flanges.

Figures 1, 3:
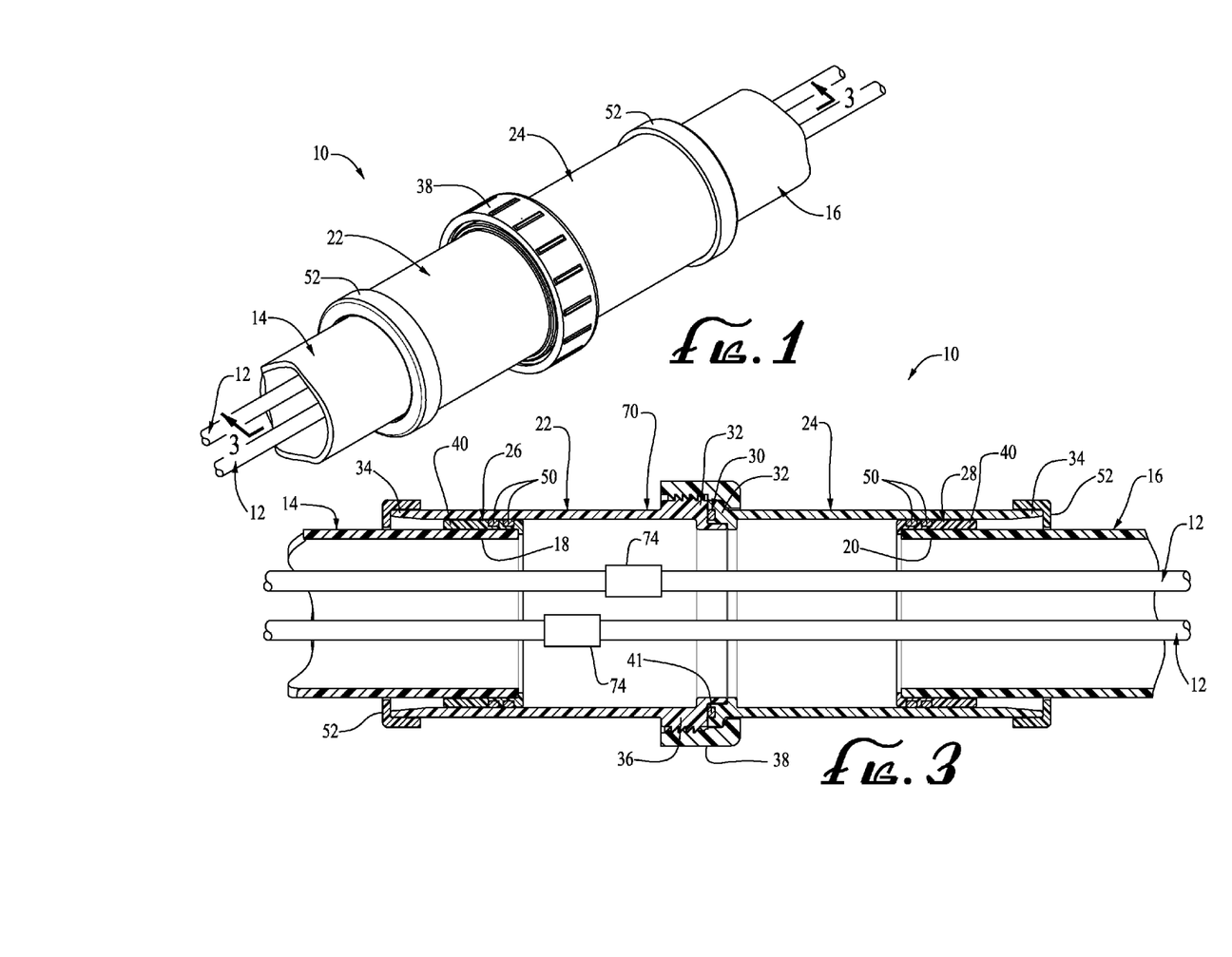
FIG. 1 is a perspective view of a closure fitting having features of the invention.
FIG. 3 is a cross sectional side view of the closure fitting illustrated in FIG. 1 taken along line 3-3.
Figure 2:
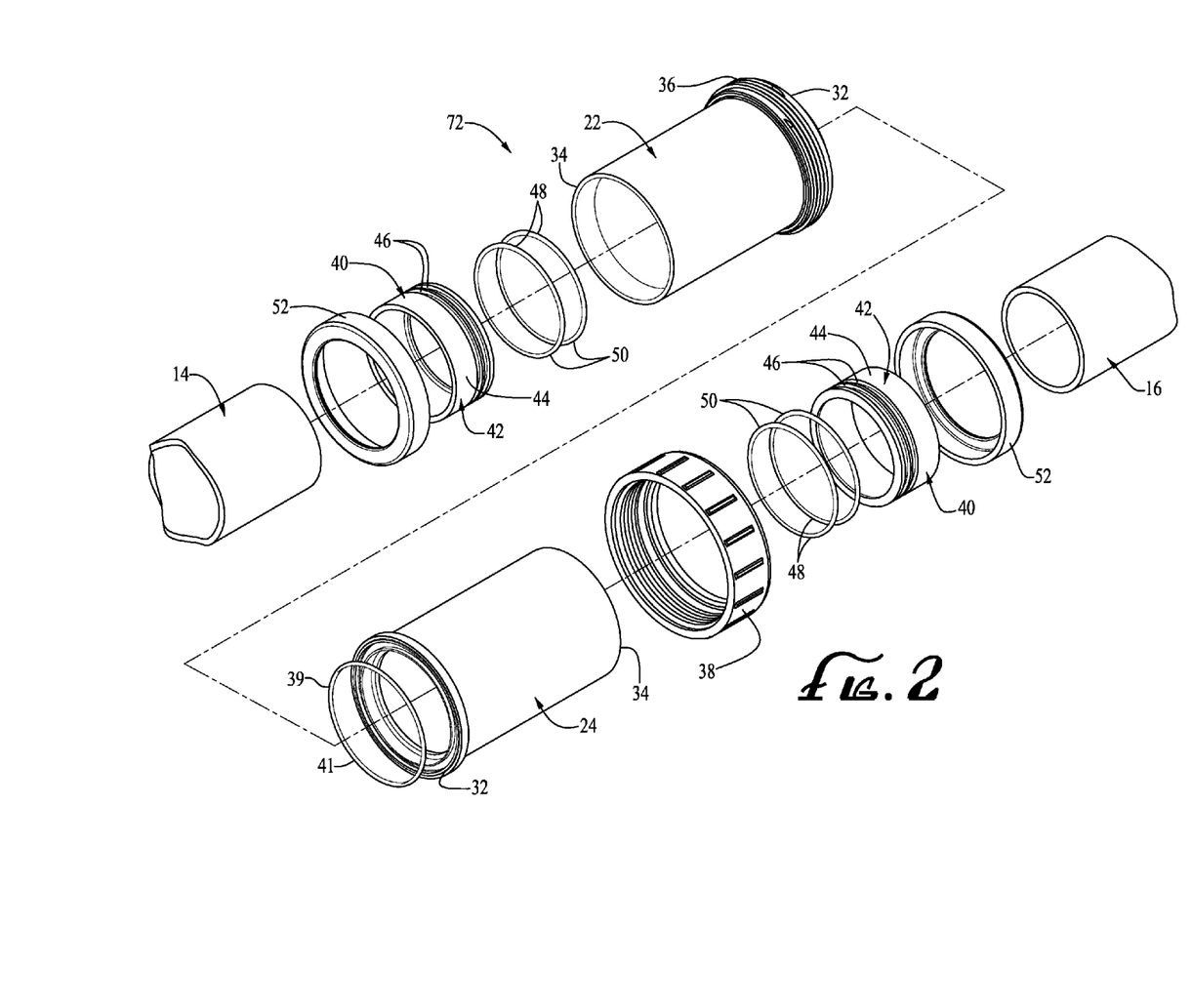
FIG. 2 is an exploded perspective view of the closure fitting illustrated in FIG. 1.

In the embodiment illustrated in FIGS. 1-3, the first seal 26, the second seal 28, or each of the first and second seals 26 and 28 comprise a seal carrier 40 having a cylindrical body 42 with a cylindrical external surface 44 and a cylindrical internal surface. The seal carrier 40 is sized and dimensioned to slip over the proximal end portion 18 or 20 of one of the containment conduit sections 14 or 16 and is attached to such containment section proximal end portion 18 or 20 in a way that the seal carrier 40 is sealed to the proximal end portion 18 or 20 of such containment conduit 14 or 16.

Each of the seal carrier cylindrical external surfaces 44 can comprise one or more indentations 46, and one or more gaskets 48 positioned in the one or more indentations 46. The gaskets 48 can comprise any gasket well-known in the art, including but not limited to, O-rings 50.

In the embodiment illustrated in FIGS. 1-3, the closure fitting 10 further comprises a pair of end caps 52, each of which is attached to and surrounds the distal end 34 of a cylindrical body 22 or 24. The end caps 52 cooperate with the seal carriers 40 to prevent the first body 22 and the second body 24 from sliding off of the containment conduit sections 14 and 16.

In the embodiment illustrated in FIGS. 4-7, both the first body 22 and second body 24 define an interior surface 54 having one or more indentations 56 at their distal ends 34. The first body 22 and second body 24 further comprise one or more gaskets 58 positioned in the one or more indentations 56. The gaskets 58 can comprise any gasket well-known in the art, including but not limited to, O-rings 60.

Figures 4, 6, 7:
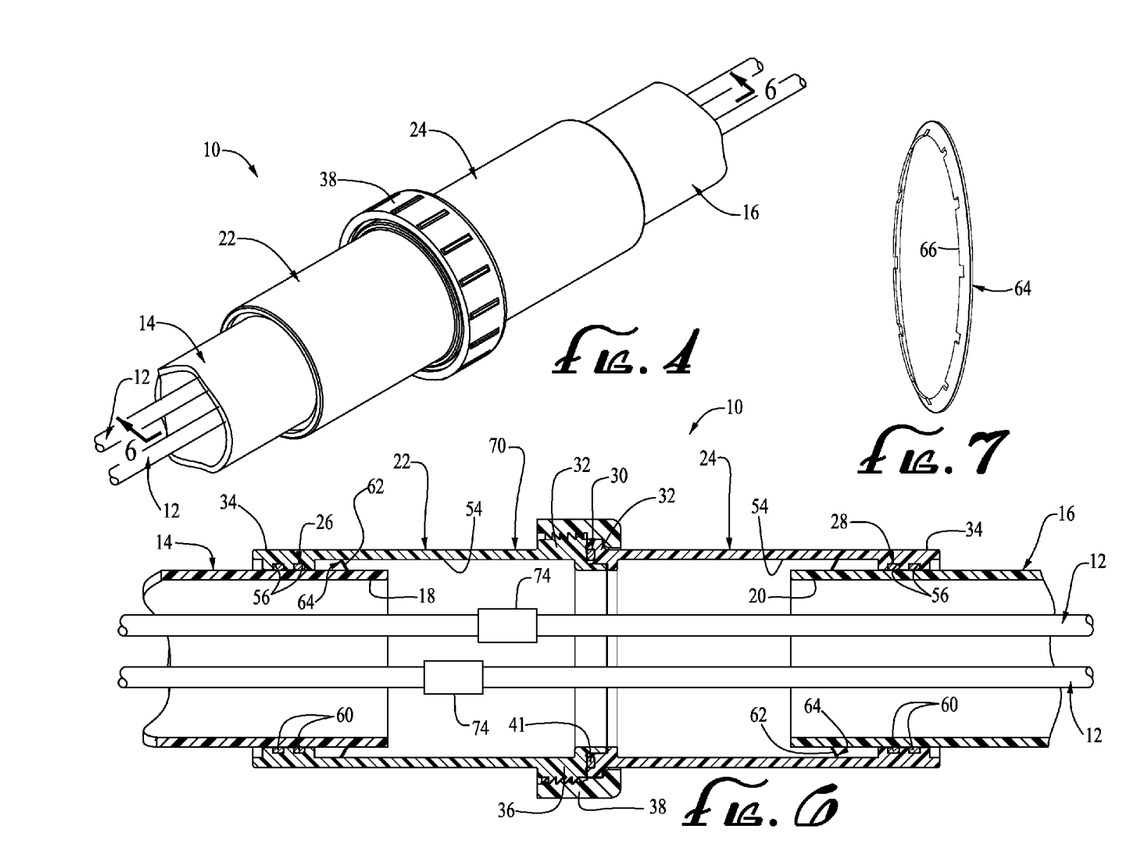
FIG. 4 is a perspective view of an alternative closure fitting having features of the invention.
FIG. 6 is a cross sectional side view of the closure fitting illustrated in FIG. 4 taken along line 6-6.
FIG. 7 is a perspective view of a gripper ring useful in the closure fitting illustrated in FIG. 4.
Figure 5:
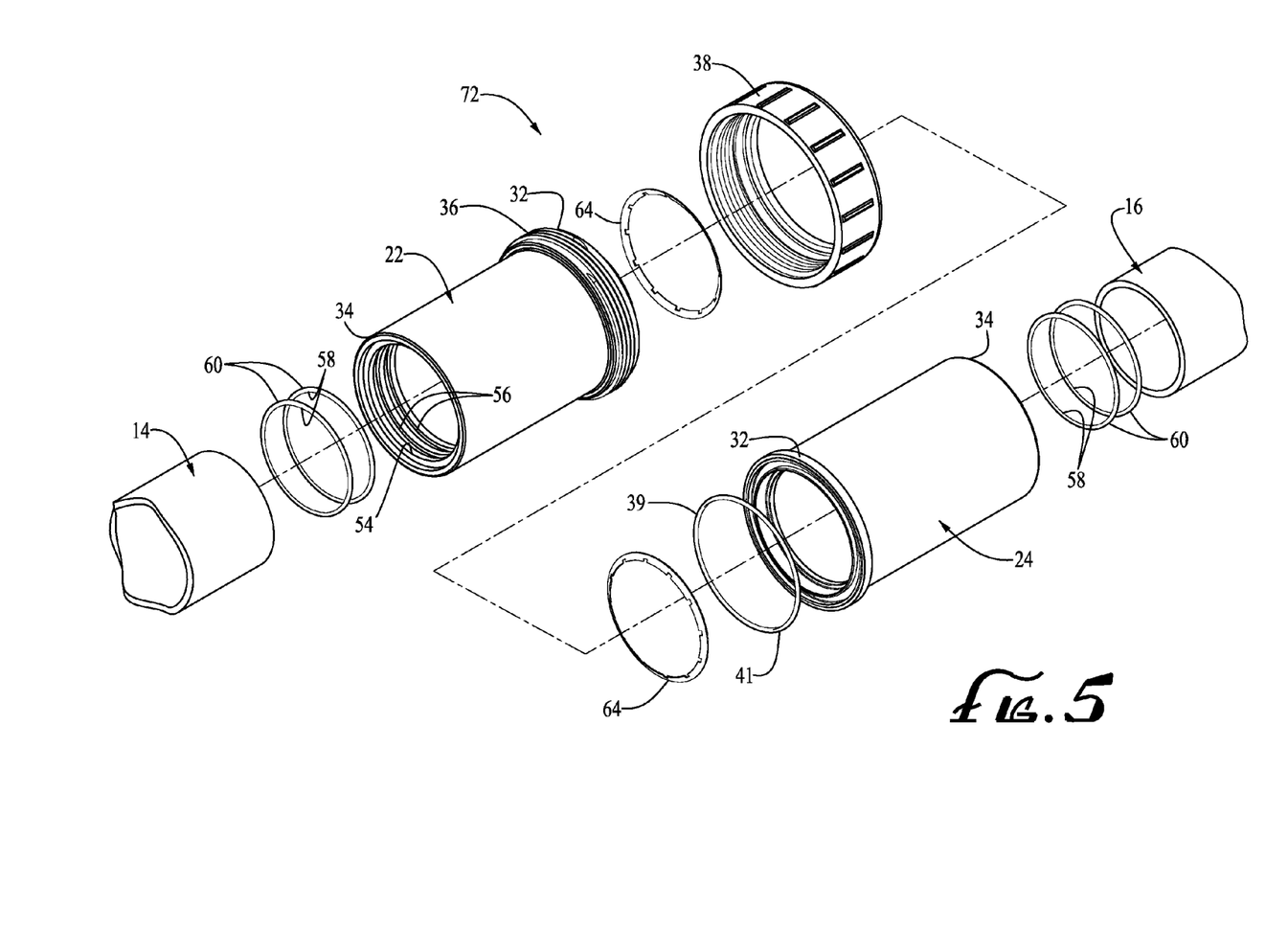
FIG. 5 is an exploded perspective view of the closure fitting illustrated in FIG. 4.

In the embodiment illustrated in FIGS. 4-7, the first body 22 and the second body 24 are prevented from sliding off of the first and second containment conduit sections 14 and 16 by a stop 62 attachable to the exterior of both the first and second containment conduit sections 14 and 16. Each stop 62 can comprise a gripper ring 64 as illustrated in FIG. 7. Each gripper ring 64 has a smaller inner diameter 66 than the outer diameter of a containment conduit section 14 or 16 such that the gripper ring 64 inner diameter 66 bends slightly to accommodate the larger outer diameter of a containment conduit section 14 or 16 and, when slid onto a containment section 14 or 16 in a first direction, resists being slipped off of the containment section 14 or 16 in a reverse direction.

In all embodiments, the closure fitting 10 of the invention forms a cylinder 70 which is capable of sealing in fluid tight fashion the proximal end portion 18 of the first containment conduit section 14 to the proximal end portion 20 of the second containment conduit section 16, but whereby the first body 22 and the second body 24 are capable of being reversibly and axially separated from one another to allow access to one or more carrier conduits 12 disposed between the first containment conduit section 14 and the second containment conduit section 16.

A second aspect of the invention is a kit 72 for assembling the closure fitting 10 of the invention. The kit 72 comprises:

(a) a first cylindrical hollow body 22 having a proximal end 32 and a distal end 34;

(b) a second cylindrical hollow body 24 having a proximal end 32 and a distal end 34, the proximal end 32 of the second body 24 being sized and dimensioned to reversibly attach to the proximal end 32 of the first body 22;

(c) a first seal 26 capable of sealing the first body 22 to a proximal end portion 18 of a first containment conduit section 14 and a second seal 28 capable of sealing the second body 24 to a proximal end portion 20 of a second containment conduit section 16, wherein (i) the first seal 26 allows the first body 22 to axially move with respect to the first containment conduit section 14, or (ii) the second seal 28 allows the second body 24 to axially move with respect to the second containment conduit section 16, or (iii) the first seal 26 allows the first body 22 to axially move with respect to the first containment conduit section 14 and the second seal 28 allows the second body 24 to axially move with respect to the second containment conduit section 16; and (d) a third seal 30 capable of reversibly sealing the proximal end 32 of the first body 22 to the proximal end 32 of the second body 24 in fluid tight communication.

The kit 72 can further comprise a first seal carrier 40 and a second seal carrier 40, as described above.

The kit 72 can further comprise a first seal O-ring 50, a second seal O-ring 50, and a third seal O-ring 50 as described above.

The kit 72 can further comprise a first end cap 52 and a second end cap 52 as also described above.

The kit 72 can further comprise a threaded nut 38 attachable to threads defined in the proximal end 36 of one of the cylindrical bodies.

The kit 72 can also comprise a pair of gripper rings 64 as described above.

A third aspect of the invention is a method of enclosing a portion of one or more carrier conduits 12 between a first containment conduit section 14 and a second containment conduit section 16 wherein (1) the first containment conduit section 14 has a first containment section proximal end portion 18 terminating in an open end and the second conduit section 16 has a second containment section proximal end portion 20 terminating in an open end; and (2) the first containment section proximal end portion 18 is opposed to and spaced apart from the second containment section proximal end portion 20.

With the embodiment illustrated in claims 1-3, the method of the invention comprises the steps of:

a) providing a closure fitting kit 72 comprising:

i) a first cylindrical hollow body 22 having a proximal end 32 and a distal end 34;

ii) a second cylindrical hollow body 24 having a proximal end 32 and a distal end 34, the proximal end 32 of the second body 24 being sized and dimensioned to reversibly attach to the proximal end 32 of the first body 22;

iii) a first seal 26 sized and dimensioned for sealing the first body 22 to a proximal end portion 18 of a first containment conduit section 14 and a second seal 28 sized and dimensioned for sealing the second body 24 to a proximal end portion 20 of a second containment conduit section 16, wherein (i) the first seal 26 allows the first body 22 to axially move with respect to the first containment conduit section 14, or (ii) the second seal 28 allows the second body 24 to axially move with respect to the second containment conduit 16 section, or (iii) the first seal 26 allows the first body 22 to axially move with respect to the first containment conduit 14 section and the second seal 28 allows the second body 24 to axially move with respect to the second containment conduit section 16;

iv) wherein the first seal 26 comprises a first seal carrier 40, the first seal carrier 40 having a cylindrical body 42 with a cylindrical external surface 44 and a cylindrical internal surface, and being sized and dimensioned to slip over the proximal end 18 of the first containment conduit section 14 and be attached to such containment section proximal end 18 in a way that the first seal carrier 40 is sealed to the proximal end 18 of such containment conduit section 14;

v) wherein the second seal 28 comprises a second seal carrier 40, the second seal carrier 40 having a cylindrical body 42 with a cylindrical external surface 44 and a cylindrical internal surface, and being sized and dimensioned to slip over the proximal end 20 of the second containment conduit section 16 and be attached to such containment section proximal end 20 in a way that the second seal carrier 40 is sealed to the proximal end 20 of such containment conduit section 16; and vi) a third seal 30 sized and dimensioned for reversibly sealing the proximal end 32 of the first body 22 to the proximal end 32 of the second body 24 in fluid tight communication;

b) disconnecting all of the carrier conduits 12 at locations 74 between the first containment conduit section 14 and the second containment conduit section 16;

c) attaching the first seal carrier 40 to the proximal end portion 18 of the first containment conduit section 14;

d) attaching the second seal carrier 40 to the proximal end portion 20 of the second containment conduit section 16;

e) sliding the first cylindrical body 22 onto the proximal end portion 18 of the first containment conduit section 14 such that the first cylindrical body 22 surrounds the proximal end portion 18 of the first containment conduit section 14 and sealing the first cylindrical body 22 to the first containment conduit section 14;

f) sliding the second cylindrical body 24 onto the proximal end portion 20 of the second containment conduit section 16 such that the second cylindrical body 24 surrounds the proximal end portion 20 of the second containment conduit section 16 and sealing the second cylindrical body 24 to the second containment conduit section 16;

g) reconnecting the carrier conduits 12; and h) sealing the proximal ends 32 of the first and second bodies 22 and 24 with the third seal 30.

In this embodiment, the kit 72 can comprise first and second end caps 52, and the method can further comprises the step of placing the first and second end caps 52 onto the first and second containment conduit sections 14 and 16, respectively, after step a) and before step b), and attaching the first and second end caps 52 to the distal ends 34 of the first and second bodies 22 and 24.

In this embodiment the third seal 30 can comprise a threaded nut 38 attachable to threads defined in the proximal end 36 of one of the cylindrical bodies 22 or 24, and the method can comprise the step of sliding the threaded nut 38 over the non-threaded cylindrical body 22 or 24 after step f) and attaching the threaded nut 38 to the threaded proximal end 36.

The attachment of the first seal carrier 40 to the first containment conduit section 14 and the attachment of the second seal carrier 40 to the second containment conduit section 16 can be made by a wide variety of attachment methods depending on the materials involved, especially depending on the materials of the first and second seal carriers 40, and the first and second containment conduit sections 14 and 16. Such attachment methods include, but are not limited to, stick welding, wire welding, TIG welding, brazing, soldering, solvent welding and use of adhesives (such as epoxy adhesives and urethane adhesives).

With the embodiment illustrated in claims 4-7, the method of the invention comprises the steps of:

a) providing a closure fitting kit 72 comprising:

i) a first cylindrical hollow body 22 having a proximal end 32 and a distal end 34;

ii) a second cylindrical hollow body 24 having a proximal end 32 and a distal end 34, the proximal end 32 of the second body 24 being sized and dimensioned to reversibly attach to the proximal end 32 of the first body 22;

iii) the first body 22 comprising a first seal 26 sized and dimensioned for sealing the first body 22 to a proximal end portion 18 of a first containment conduit 14 and the second body 24 comprising a second seal 28 sized and dimensioned for sealing the second body 24 to a proximal end portion 20 of a second containment conduit section 16, wherein (i) the first seal 26 allows the first body 22 to axially move with respect to the first containment conduit section 14, or (ii) the second seal 28 allows the second body 24 to axially move with respect to the second containment conduit section 16, or (iii) the first seal 26 allows the first body 22 to axially move with respect to the first containment conduit section 14 and the second seal 28 allows the second body 24 to axially move with respect to the second containment conduit section 16;

iv) a third seal 30 sized and dimensioned for reversibly sealing the proximal end 32 of the first body 22 to the proximal end 32 of the second body 24 in fluid tight communication;

v) a first gripper ring 64 having a smaller inner diameter 66 than the outer diameter of a containment conduit section such that the first gripper ring 64 inner diameter 66 bends slightly to accommodate the larger outer diameter of a containment conduit section 14 or 16 and, when slid onto a containment section 14 or 16 in a first direction, resists being slipped off of the containment section 14 or 16 in a reverse direction; and vi) a second gripper ring 64 having a smaller inner diameter 66 than the outer diameter of a containment conduit section such that the second gripper ring 64 inner diameter 66 bends slightly to accommodate the larger outer diameter of a containment conduit section and, when slid onto a containment section 14 or 16 is a first direction, resists being slipped off of the containment section 14 or 16 in a reverse direction;

b) disconnecting all of the carrier conduits 12 at locations 74 between the first containment conduit section 14 and the second containment conduit section 16;

c) sliding the first cylindrical body 22 onto the proximal end 18 of the first containment conduit section 14 such that the first cylindrical body 22 surrounds the proximal end 18 of the first containment conduit 14 section and sealing the first cylindrical body 22 to the first containment conduit section 14 with the first seal 26;

d) sliding the second cylindrical body 24 onto the proximal end 20 of the second containment conduit 16 section such that the second cylindrical body 24 surrounds the proximal end 20 of the second containment conduit section 16 and sealing the second cylindrical body 24 to the second containment conduit section 16 with the second seal 28;

e) attaching the first and second gripper rings 64 to the exteriors of the first and second containment conduit sections 14 and 16, respectively;

f) reconnecting the carrier conduits 12; and g) sealing the proximal ends 32 of the first 22 and second bodies 24 with the third seal 30.

In this embodiment the third seal 30 can comprise a threaded nut 38 attachable to threads defined in the proximal end 36 of one of the cylindrical bodies 22 or 24, and the method can comprise the step of sliding the threaded nut 38 over the non-threaded cylindrical body 22 or 24 after step e).

The invention is advantageous in making repairs or alterations to carrier conduits. The drawback to currently used closure fittings is it is difficult to do a quality simultaneous cementing job to attach the closure fitting, and the assembly is permanent so if there is a problem the entire section must be removed and replaced.

This is especially true where thermoplastic fittings are used on thermoplastic pipes. Thermoplastic fittings are most efficiently attached to thermoplastic pipes by solvent welding. Solvent welding requires a substantial amount of time for the weld to properly cure. The time lost in having to wait for solvent welds to cure is a substantial problem. This invention avoids these problems because the closure fitting is easily attached and removed without the need for welding.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A closure fitting for enclosing a portion of one or more carrier conduits between a first containment conduit section and a second containment conduit section, wherein the first containment conduit section has a proximal end portion terminating an open end, wherein the second containment conduit has a proximal end proximal terminating in an open end, and wherein the open end net of the first containment section proximal end portion is opposed to and spaced from the open end of the second containment section proximal end portion, the closure fitting comprising:

(a) first cylindrical hollow body having a proximal end and a distal end;

(b) a second cylindrical hollow body having a proximal end and a distal end, the proximal end of the second body being reversibly attached in fluid tight communication to the proximal end of the first body;

(c) a first seal for sealing the first body to the proximal end portion of the first containment conduit and a second seal for sealing the second body to the proximal end portion of the second containment conduit, wherein (i) the first seat allows the first body to axially move with respect to the first containment conduit section, or (ii) the second seal allows the second body to axially move with respect to the second containment conduit section, or (iii) the first seal allows the first body to axially move with respect to the first containment conduit section and the second seal allows the second body to axially move with respect to the second containment conduit section; and (d) a third seal for reversibly sealing the proximal end of the first body to the proximal end of the second body;

wherein the proximal end of one of the cylindrical bodies comprises a threaded end, and the third seal comprises a threaded nut for attachment to the threaded proximal end of the cylindrical body;

whereby the closure fitting forms a cylinder which is capable of sealing in fluid tight fashion the proximal end portion of the first containment conduit to the proximal end portion of the second containment conduit, but whereby the first body and the second body are capable of being reversibly and axially separated from one another to allow access to one or more carrier conduits disposed between the first contaminant conduit section and the second containment conduit section.

2. A closure fitting for enclosing a portion of one or more carrier conduits between a first containment conduit section and a second containment conduit section, wherein the first containment conduit section has a proximal end portion terminating in an open end, wherein the second containment conduit has a proximal end portion terminating in an open end, and wherein the open end of the first containment section proximal end portion is opposed to and spaced apart from the open end of the second containment section proximal end portion, the closure fitting comprising:

a first cylindrical hollow body having a proximal end and a distal end;

(b) a second cylindrical hollow body having a proximal end and a distal end, the proximal end of the second body being reversibly attached in fluid tight communication to the proximal end of the first body;

(c) a first seal for sealing the first boy to the proximal end portion of the first containment conduit and a second seal for sealing the second body to the proximal end portion of the second containment conduit, wherein (i) the first seal allows the first body to axially move with respect to the first containment conduit section, or (ii) the second seal allows the second body to axially move with respect to the second containment conduit section, or (iii) the first seal allows the first body to axially move with respect to the first containment conduit section and the second seal allows the second body to axially move with respect to the second containment conduit section;

(d) a third seal for reversibly sealing the proximal end of the first body to the proximal end of the second body; and (e) an end cap attached to and surrounding the distal end of each cylindrical body;

whereby the closure fitting forms a cylinder which is capable of sealing in fluid tight fashion the proximal end portion of the first containment conduit to the proximal end portion of the second containment conduit, but whereby the first body and the second body are capable of being reversibly and axially separated from one another to allow access to one or more carrier conduits disposed between the first containment conduit section and the second containment conduit section.

3. The closure fitting of claim 1 or 2 wherein the first body and the second body are prevented from sliding off of the first and second containment conduit sections by a stop attachable to the exterior of both the first and second containment conduit sections.

4. A closure fitting for enclosing a portion of one or more carrier conduits between a first containment conduit section and a second containment conduit section, wherein the first containment conduit section has a proximal end portion terminal in an open end, wherein the second containment conduit has a proximal end portion terminating in an open end, and wherein the open end of the first containment section proximal end portion is opposed to and spaced apart from the open end of the second containment section proximal end portion, the closure fitting comprising:
 (a) a first cylindrical hollow body having a proximal end and a distal end;
 (b) a second cylindrical hollow body having a proximal end and a distal end, the proximal end of the second body being reversibly attached in fluid tight communication to the proximal end of the first body;
 (c) a first seal for sealing the first body to the proximal end portion of the first containment conduit and a second seal for sealing the second body to the proximal end portion of the second containment conduit, wherein (i) the first seal allows the first body to axially move with respect to the first containment conduit section, or (ii) the second seal allows the second body to axially move with respect to the second containment conduit section, or (iii) the first seal allows the first body to axial move with respect to the first containment conduit section and the second seal allows the second body to axially move with respect to the second containment conduit section; and
 (d) a third seal for reversibly sealing the proximal end of the first body to the proximal end of the second body;
 whereby the closure fitting forms a cylinder which is capable of sealing in fluid tight fashion the proximal end portion of the first containment conduit to the proximal end portion of the second containment conduit, but whereby the first body and the second body are capable of being reversibly and axially separated from one another to allow access to one or more carrier conduits disposed between the first containment conduit section and the second containment conduit section;
 wherein the first body and the second body are prevented from sliding off of the first and second containment conduit sections by a stop attachable to the exterior of both the first and second containment conduit sections; and
wherein each stop is provided by a gripper ring having a smaller inner diameter than the outer diameter of a containment conduit section such that the gripper ring inner diameter bends slightly to accommodate the larger outer diameter of the containment conduit section and, when slid onto the containment section in a first direction, resists being slipped off of the containment section in a reverse direction.

5. The closure fitting of claim 4 wherein the first seal, the second seal, or each of the first and second seals comprise a seal carrier having a cylindrical body with a cylindrical external surface and a cylindrical internal surface, each seal carrier being sized and dimensioned to slip over the proximal end portion of one of the containment conduit sections and be attached to such containment section proximal end portion in a way that the seal carrier is sealed to the proximal end portion of such containment conduit portion.

6. The closure fitting of claim 5 wherein the cylindrical external surface comprises one or more indentations, and one or more gaskets positioned in the one or more indentations.

7. The closure fitting of claim/wherein the gaskets comprise O-rings.

8. The closure fitting of claim 4 wherein both the first body and second body define an interior surface having one or more indentations at their distal ends, the first body and second body further comprising one or more gaskets positioned in the one or more indentations.

9. The closure fitting of claim 8 wherein the gaskets are O-rings.

10. The closure fitting of claim 4 wherein the first and second cylindrical bodies are sufficiently transparent to allow visual access to their interiors.

11. A closure fitting kit comprising:
 (a) a first cylindrical hollow body having a proximal end and a distal end;
 (b) a second cylindrical hollow body having a proximal end an distal end the proximal end of the second body being sized and dimensioned to reversibly attach to the proximal end of the first body;
 (c) a first seal capable of sealing the first body to a proximal end portion of a first containment conduit section and a second seal capable of sealing the second body to a proximal end portion of a second containment conduit section, wherein (i) the first seal allows the first body to axially move with respect to the first containment conduit section, or (ii) the second seal allows the second body to axially move with respect to the second containment conduit section, or (iii) the first seal allows the first body to axially move with respect to the first containment conduit section and the second seal allows the second body to axially move with respect to the second containment conduit section;
 (d) a third seal capable of reversibly sealing the proximal end of the first body to the proximal end of the second boy in fluid tight communication; and
 (e) a first end cap and a second end cap.

12. A closure fitting kit comprising:
 (a) a first cylindrical hollow body having a proximal end and a distal end;
 (b) a second cylindrical hollow body having a proximal end and a distal end, the proximal end of the second body being sized and dimensioned to reversibly attach to the proximal end of the first body;
 (c) a first seal capable of sealing the first body to a proximal end portion of a first containment conduit section and a second seal capable of sealing the second body to a proximal end portion of a second containment conduit section, wherein (i) the first seal allows the first body to axially move with respect to the first containment conduit section, or (ii) the second seal allows the second body to axially move with respect to the second containment conduit section, or (iii) the first seal allows the first body to axially move with respect to the first containment conduit section and the second seal allows the second body to axially move with respect to the second containment conduit section;
 (d) a third seal capable of reversibly sealing the proximal end of the first body to the proximal end of the second body in fluid tight communication; and
 (e) a nut attachable to threads defined in the proximal end of one of the cylindrical bodies.

13. The closure fitting kit of claim 11 or 12 further comprising a first seal O-ring, a second seal O-ring, and a third seal O-ring.

14. The closure fitting kit of claim 11 or 12 further comprising a first seal carrier and a second seal carrier.

15. A method of enclosing a portion of one or more carrier conduits between a first containment conduit section and a second containment conduit section, wherein the first containment conduit section has a proximal end portion terminating in an open end, wherein the second containment conduit has a proximal end portion terminating in an open end, and wherein the open end of the first containment section proximal end portion is opposed to and spaced apart from the open en of the second containment section proximal end portion, the method comprising the steps of:
  a) providing a closure fitting kit comprising:
    i) a first cylindrical hollow body having proximal end and a distal end;
    ii) a second cylindrical hollow body having a proximal end and a distal end, the proximal end of the second body being sized and dimensioned to reversibly attach to the proximal end of the first body;
    iii) a first seal sized and dimensioned for sealing the first body to a proximal end portion of a first containment conduit section and a second seal sized and dimensioned for sealing the second body to a proximal end portion of a second containment conduit section, wherein (i) the first seal allows the first body to axially move with respect to the first containment conduit section, or (ii) the second seal allows the second body to axially move with respect to the second containment conduit section, or (iii) the first seal allows the first body to axially move with respect to the first containment conduit section and the second seal allows the second body to axially move with respect to the second containment conduit section;
    iv) wherein the first seal comprises a first seal carrier, the first seal carrier having a cylindrical body with a cylindrical external surface and a cylindrical internal surface, and being sized and dimensioned to slip over the proximal end of the first containment conduit section and be attached to the second containment conduit section proximal end in a way that the first seal carrier is sealed to the proximal end of the first containment conduit section:
    v) wherein the second seal comprises a second seal carrier, the second seal carrier having cylindrical body with a cylindrical external surface and a cylindrical internal surface, and being sized and dimensioned to slip over the proximal end of the second containment conduit section and be attached to the second containment conduit section proximal end in a way that the second seal carrier is sealed to the proximal end of the second containment conduit section; and
      vi) a third seal sized and dimensioned for reversibly sealing the proximal end of the first to body to the proximal end of the second body in fluid tight communication;
  b) disconnecting all of the carrier conduits at locations between the first containment conduit section and the second containment conduit section;
  c) attaching the first seal carrier to the proximal end of the first containment conduit section;
  d) attaching the second seal carrier to the proximal end of the second containment conduit section;
  e) sliding the first cylindrical body onto the proximal end of the first containment conduit section such that the first cylindrical body surrounds the proximal end of the first containment conduit section and sealing the first cylindrical body to the first containment conduit section;
  f) sliding the second cylindrical body onto the proximal end of the second containment conduit section such that the second cylindrical body surrounds the proximal end of the second containment conduit section and sealing the second cylindrical body to the second containment conduit section;
  g) reconnecting the carrier conduits; and
  h) sealing the proximal ends of the first and second bodies with the third seal;
wherein the kit further comprises first and second end caps, and the method further comprises the step of placing the first and second end caps onto the first and second containment conduit sections, respectively, after step a) and before step b), and attaching the first and second end caps to the distal ends of the first and second bodies.

16. A method of enclosing a portion of one or more carrier conduits between a first containment conduit section and a second containment conduit section, wherein the first containment conduit section has a proximal end portion terminating in an open end, wherein the second containment conduit has a proximal end portion terminating in an open end, and wherein the open end of the first containment section proximal end portion is opposed to and spaced apart from the opened of the second containment section proximal end portion, the method comprising the steps of:
  a) providing closure fitting kit composing:
    i) a first cylindrical hollow body having a proximal end and a distal end;
    ii) a second cylindrical hollow body having a proximal end and a distal end, the proximal end of the second body being sized and dimensioned to reversibly attach to the proximal end of the first body;
    iii) a first seal sized and dimensioned for sealing the first body to a proximal end portion of a first containment conduit section and a second seal sized and dimensioned for sealing the second body to a proximal end portion of a second containment conduit section, wherein (i) the first seal allows the first body to axially move with respect to the first containment conduit section, or (ii) the second seal allows the second body to axially move with respect to the second containment conduit section, or (iii) the first seal allows the first body to axially move with resect to the first containment conduit section and the second seal allows the second body to axially move with respect to the second containment conduit section;
    iv) wherein the first seal comprises a first seal carrier, the first carrier having a cylindrical body with a cylindrical external surface and a cylindrical internal surface, and being sized and dimensioned to slip over the proximal end of the first containment conduit section and be attached to the second containment conduit section proximal end in a way that the first seal carrier is sealed to the proximal end of the first containment conduit section;
    v) herein the second seal comprise a second seal carrier, the second seal carrier having a cylindrical body with a cylindrical external surface and a cylindrical internal surface, and being sized and dimensioned to slip over the proximal end of the second containment conduit section and be attached to the second containment conduit section proximal end in a way that the second seal carrier is sealed to the proximal end of the second containment conduit section; and vi) a third seal sized and dimensioned for reversibly sealing the proximal end of the first body to the proximal end of the second body in fluid tight communication;

b) disconnecting all of the carrier conduits at locations between the first containment conduit section and the second containment conduit section;

c) attaching the first seal carrier to the proximal end of the first containment conduit section;

d) attaching the second seal carrier to the proximal end of the second containment conduit section;

e) sliding the first cylindrical body onto the proximal end of the first containment conduit section such that the first cylindrical body surrounds the proximal end of the first containment conduit section and sealing the first cylindrical body to the first containment conduit section;

f) sliding the second cylindrical body onto the proximal end of the second containment conduit section such that the second cylindrical body surrounds the proximal end of the second containment conduit section and sealing the second cylindrical body to the second contaminant conduit section;

g) reconnecting the carrier conduits; and h) sealing the proximal ends of the first and second bodies with the third seat and wherein the third seal comprises a nut attachable to threads defined in the proximal end of one of the cylindrical bodies, and the method further comprises the steps of attaching the threaded nut to the threaded proximal end.

17. A method of enclosing a portion of one or more carrier conduits between a first containment conduit section and a second containment conduit section, wherein the first containment conduit section has a proximal end portion terminating in an open end, wherein the second containment conduit section has a proximal end portion terminating in an open end, and wherein the open end of the first containment section proximal end portion is opposed to and spaced apart from the open end of the second containment section proximal end portion, the method comprising the steps of:

a) providing a closure fitting kit comprising:

i) a first cylindrical hollow body having a proximal end and a distal end;

ii) a second cylindrical hollow body having a proximal end and a distal end, the proximal end of the second body being sized and dimensioned to reversibly attach to the proximal end of the first body;

iii) a first seal sized and dimensioned for sealing the first body to a proximal end portion of a first containment conduit section and the second body comprising a second seal sized and dimensioned for sealing the second body to a proximal end portion of a second containment conduit section, wherein (i) the first seal allows the first body to axially move with respect to the first containment conduit section, or (ii) the second seal allows the second body to axially move with respect to the second containment conduit section, or (iii) the first seal allows the first body to axially move with respect to the first containment conduit section and the second seal allows the second body to axially move with respect to the second containment conduit section;

iv) a third seal sized and dimensioned for reversibly sealing the proximal end of the first body to the proximal end of the second body in fluid tight communication;

v) a first gripper ring having a smaller inner diameter than the outer diameter of the first containment conduit section such that the first gripper ring inner diameter bends slightly to accommodate the larger outer diameter of the first containment conduit section and, when slid onto the first containment section in a first direction, resists being slipped off of the first containment section in a reverse direction; and vi) a second gripper ring having a smaller inner diameter than the outer diameter of the second containment conduit section such that the second gripper ring inner diameter bends slightly to accommodate the larger outer diameter of the second containment conduit section and, when slid onto the second containment section is a first direction, resists being slipped off of the second containment section in a reverse direction;

b) disconnecting all of the carrier conduits at locations between the first containment conduit section and the second containment conduit section;

c) sliding the first cylindrical body onto the proximal end of the first containment conduit section such that the first cylindrical body surrounds the proximal end of the first containment conduit section and sealing the first cylindrical body to the first containment conduit section with the first seal;

d) sliding the second cylindrical body onto the proximal end of the second containment conduit section such that the second cylindrical body surrounds the proximal end of the second containment conduit section and sealing the second cylindrical body to the second containment conduit section with the second seal;

e) attaching the first and second gripper rings to the exteriors of the first and second containment conduit sections, respectively;

f) reconnecting the carrier conduits; and g) sealing the proximal ends of the first and second bodies with the third seal.

18. The method of claim 17 wherein the third seal comprises a nut attachable to threads defined in the proximal end of one of the cylindrical bodies, and the method further comprises the step of sliding the threaded nut over the non-threaded cylindrical body and attaching the threaded nut to the threaded proximal end.

* * * * *